Sept. 17, 1935.  F. W. JACKMAN  2,014,435
COMPOSITE PICTURE
Filed Oct. 12, 1931  2 Sheets-Sheet 1
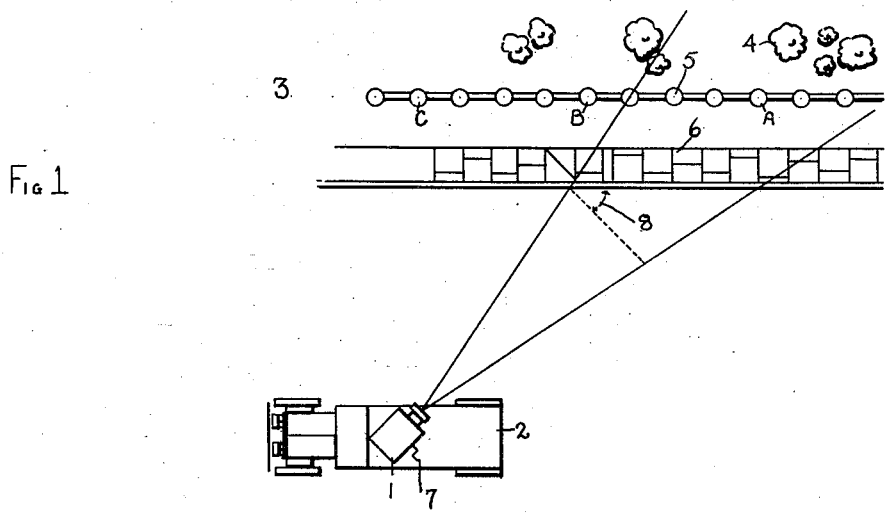
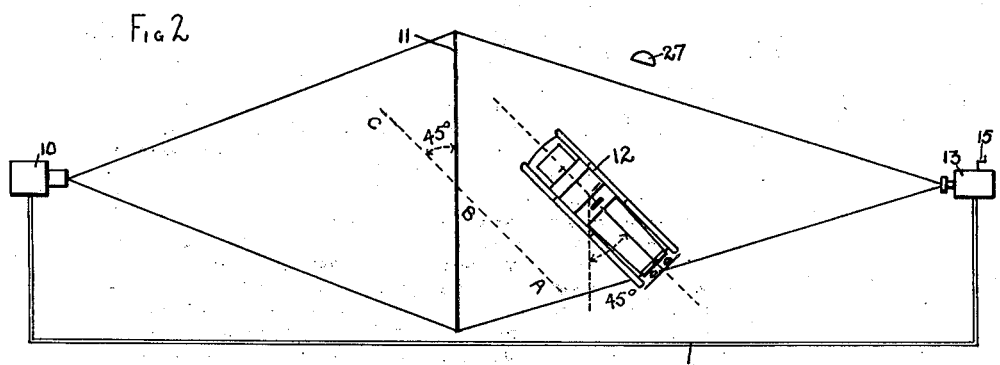
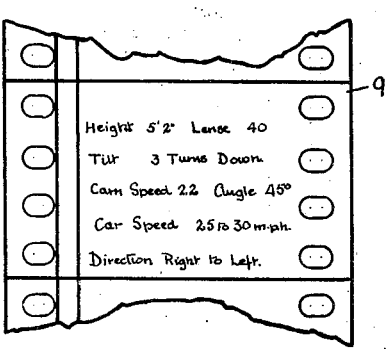
INVENTOR:
FRED. W. JACKMAN
BY
W E Beatty
ATTORNEY.

Sept. 17, 1935.  F. W. JACKMAN  2,014,435
COMPOSITE PICTURE
Filed Oct. 12, 1931  2 Sheets-Sheet 2
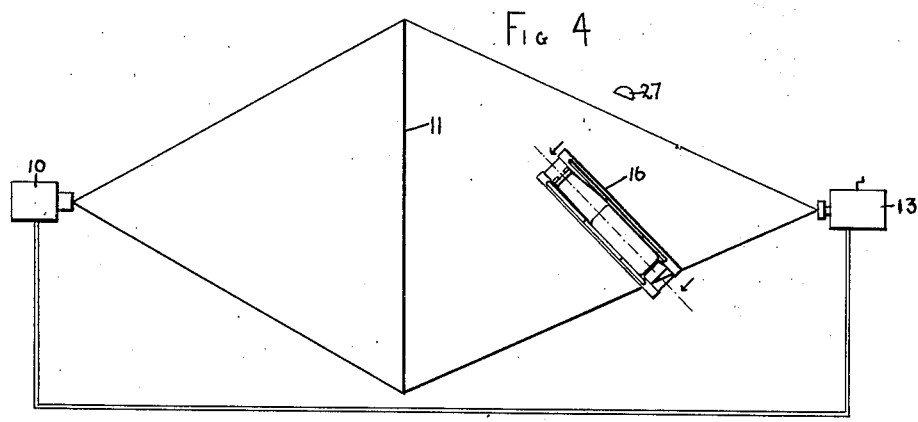
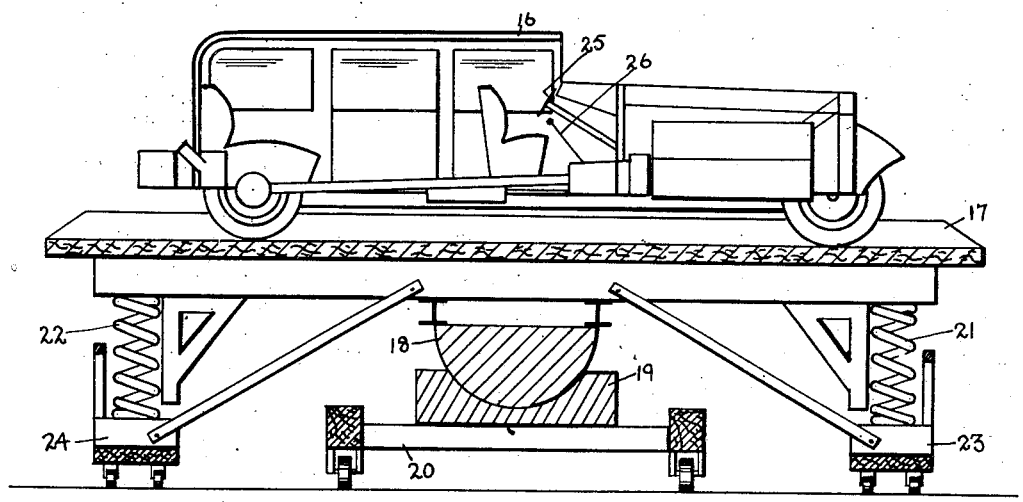
INVENTOR:
FRED. W JACKMAN.
BY
W. U. Beatty
ATTORNEY.

Patented Sept. 17, 1935

2,014,435

UNITED STATES PATENT OFFICE

2,014,435

COMPOSITE PICTURE

Fred W. Jackman, Beverly Hills, Calif., assignor to Warner Bros. Pictures, Inc., New York, N. Y., a corporation of Delaware Application October 12, 1931, Serial No. 568,363

4 Claims. (Cl. 88—16)

The invention pertains to the art of photography and has to do with the production of composite pictures, particularly motion pictures.

A composite picture differs from the ordinary type of picture in that the components forming the composite whole are derived from different and independent sources. In other words, the background component is usually photographed in a place distant from the place where the foreground component is photographed.

Prior to this invention, it was the practice to examine the photographed background component and then arrange the foreground component which is to be combined therewith, before the camera, by guess work. The result was usually unsatisfactory, because the setting of the foreground component or action was somewhat foreign in relation to the background component, resulting in a grotesque and unpleasing picture. This results in a defect which others are experiencing even to the present day and wherein the action appears to slide or move in an unnatural manner with reference to the background; that is, the background appears to move at one rate of speed and the foreground at a different rate of speed. Another defect is that the perspective view of the background component does not appear the same as the perspective view of the action or foreground component.

The invention provides a method of co-relating the photographing of a foreground or action component with the photographing of a background component whereby these components appear in optical harmony and correct relationship with each other in the final composite picture.

The invention, therefore, provides a method of producing a composite photograph with the correct perspective setting of the foreground component in relation to the background component so that the camera appears to have photographed both components simultaneously, i. e., from the same point of view.

This invention refers more particularly to the production of composite pictures of vehicles, such as automobiles, wherein it is desired to depict the vehicle as moving, whereas the actors in the vehicle are to be photographed in the studio whereby their conversation may be recorded free from road noise. Later on, a suitable amount of separately recorded road noise is mixed with their recorded conversation, as will be apparent to one skilled in the art.

In photographing the background scene for the vehicle, use is made of a board or slate upon which is noted the height of the camera from the ground, the type of lens used, the number of turns of the camera tilt handle, up or down, the speed of the film through the camera, the angle at which the camera is set with relation to the line of direction of movement of the camera (assuming a running shot), the speed at which the car carrying the camera is moving, and the direction in which the car and camera are moving. This information is ascertained and fixed previously to taking the background scene and is photographed on the first few feet of film used in taking the background scene. In taking the final composite motion picture comprising the previously prepared background scene and the desired action, the data referred to above is projected upon the screen for the edification of the cameraman in photographing the final composite picture. It is here assumed that the two components of the composite picture are combined by photographing the action or foreground component before a translucent screen upon which the background component is projected by a projector operating in synchronism with the camera. The cameraman, therefore, in making the final composite picture, with the data referred to above available, sets and regulates the camera, the projector and the foreground scene and action in accordance with this information. This produces a composite picture in which the component parts are in correct and proper relation to each other.

To further simulate road conditions, in the case of an auto shot, the auto may be jostled while the final composite picture is being taken, and the controls for the auto, such as the steering wheel, gear shift lever and brake may be manipulated by the driver in a manner appropriate to the background scene. Furthermore, the auto may be jacked up and the wheels spun while the final composite picture is being photographed.

For further details of the invention, reference may be made to the drawings, wherein Fig. 1 is a plan view diagrammatically showing an automobile truck with a camera mounted thereon for photographing a background scene.

Fig. 2 is a plan view diagrammatically showing a synchronously connected camera and projector on opposite sides of a translucent screen for photographing composite pictures.

Fig. 3 is an enlarged view of a piece of cinematographic film bearing the data referred to above for use in setting the foreground action and the camera therefor in proper relation.

Fig. 4 is a modification of Fig. 2.

Fig. 5 is a sectional elevation of an arrangement for supporting the automobile so that road shots may be simulated.

Referring in detail to Fig. 1, the motion picture camera 1 is mounted on the automobile truck 2 for photographing a background scene 3 which may comprise, as shown, trees 4, fence 5, sidewalk 6, etc. In one particular instance, the height of the camera above the ground was 5 ft. 2 in., the type of lens used was No. 40, the tilt handle 7 of the camera was given three turns to tilt the camera down, the film speed through the camera was 22 frames per second, the angle between the optical axis of the camera 1 and the vertical plane of the background scene (represented by angle 8) was 45 deg., the speed of the truck 2 was from 25 to 30 m. per hour, and the direction of the truck was from right to left. This data was entered on the conventional board or slate (not shown) and photographed on the first few feet of film in camera 1. After this film is developed, a positive print 9, shown in Fig. 3, of this negative film will bear this data, as indicated.

With the motion picture which has thus been taken of the background scene 3, it is desired to combine a foreground scene of a vehicle, such as an automobile, and which may have one or more actors therein. For this purpose a positive print of a background scene 3 is supplied to the projector 10 which projects the background scene 3 on the translucent screen 11. In front of the translucent screen 11 is placed an automobile or other vehicle 12, which may have one or more actors therein (not shown), this foreground component being illuminated (without thereby illuminating the screen 11) by one or more lamps 27. The automobile 12 and the action therein are photographed before the picture projected on screen 11 by means of the motion picture camera 13 operating in synchronism with the projector 10. Both mechanical and electrical synchronous couplings are well understood in the art, and they are diagrammatically represented by the coupling 14.

The data on film 9 is used in setting the auto 12 with relation to the screen 11 and the camera 13, in order that the final composite picture photographed by camera 13 may actually depict the automobile 12 as though it had been driven in front of the background scene 3 and between that scene and the camera 1. In other words, the data shown on film 9 is used to properly co-relate the parts so that it will appear in the final composite picture that the camera 1 had actually made a running shot of the auto 12 and its occupants while it was passing in front of the background scene 3. Accordingly, the height of the camera 13 is adjusted so that it is 5 ft. 2 in. above the ground. Furthermore, it is provided with a lens type No. 40, the tilt handle 15 of the camera 13 is given three turns to tilt the camera down, and the film speed through camera 13 is set at 22 frames per second.

In view of the fact that the elements A, B and C of the background scene successively come into view in the order named, the background scene is projected by projector 10 onto screen 11 so that the scene on screen 11 as viewed by camera 13 progresses from right to left and, therefore, the auto 12 is headed towards the left. The background scene on screen 11 appears to extend at an angle of 45 deg. with reference to the screen, this being the same as angle 8 in Fig. 1. Therefore, in order that auto 12 may appear to progress parallel to the background scene 3, the auto 12 is turned from a position at right angles to the optical axis of camera 13 by an angle of exactly 45 deg. With the screen 11, auto 12 and camera 13, adjusted and regulated as specified, the camera 13 will photograph a composite picture of auto 12 and its occupants before the background scene projected on screen 11, with the result that the final composite picture will appear the same as it would have if the camera 1 had photographed the automobile 12 while running in front of the background scene 3.

To further assist in the illusion that the auto 12 was actually photographed while it was being driven before the background scene 3, the auto 12 may be jostled or rocked while the final composite picture is being made. A simple way of doing this, if only a part of the auto appears in the picture, is to have an assistant jump up and down on the running board of the car; or, instead, a suitable lever, such as a 2" x 4" timber eight or ten feet long, may be placed under the car with one end on the floor and an intermediate portion bearing on the chassis of the car to rock it up and down. A more refined apparatus for accomplishing the same object is shown in Fig. 5, wherein the auto 16 is carried by an especially constructed support to facilitate the rocking movement of the car to simulate road travel or shocks. In this case, the auto 16 is supported by platform 17, the major part of the weight of which is carried by the spherical bearing member 18 resting in a complementary bearing member 19 carried by truck 20. The ends of platform 17 are supported by springs 21 and 22, which bear against the under side of the platform 17 and against the top of trucks 23 and 24, respectively.

A spring such as 21 is provided at each of the four corners of the platform 17, the pair of springs at each end of the platform being carried by its corresponding truck. In this way, an operator may readily rock the platform 17 to rock the auto 16.

In order to still further simulate road conditions, the driver of auto 16, while being photographed before the screen 11, may operate the steering wheel 25 and the gear shift lever 26, as well as the other usual controls, in harmony with the background scene. For example, when the background scene turns a corner, the steering wheel 25 is manipulated to correspond. In order that the driver may know when and how to manipulate the controls for auto 16 (or 12) the following arrangements may be used: In the first place, the picture may be projected on screen 11 in Fig. 4 so that the action passes from left to right; whereupon, the auto 16 will be headed towards the right, as shown. In this case, the driver will see the background scene projected on screen 11, and he will thereby be apprized of the manner in which the controls 25, 26, etc., should be manipulated. In the second place, no sound may be recorded at the time that auto 16 is photographed, whereby a director may cue the driver. In the third place, the driver may be furnished with a cue sheet, and signal lights (under control of the director) mounted on the dashboard, thereby indicating when and how the controls should be manipulated.

It will be obvious to those skilled in the art that, if it is desired to produce a composite motion picture in natural colors, a color camera may be used instead of camera 13, and the projector 10 may project a motion picture in color on screen 11, the foreground component or action, such as auto 12 and its occupants, appearing in the color desired in the final picture.

The conversation between the occupants in auto 12 or 16 may be recorded on a film or disk at the same time that the final composite picture is photographed or at another time. In either case, a sound record of previously prepared typical road noise is mixed with the recorded conversation in preparing the final sound record to accompany the composite picture, as is well understood in the art.

I claim:

1. The method of making a composite motion picture of a background scene and a foreground scene or action component comprising a vehicle, which comprises transporting a motion picture camera in operation at a motion picture speed before the background scene with the camera set at a definite and fixed angle with respect to a position directly in front of said background scene, and with a definite tilt and height from the ground, whereby a background motion picture is taken with a definite perspective viewpoint, projecting said background motion picture on a translucent screen in front of which is arranged a motion picture camera having light sensitive film, arranging before said light sensitive film a vehicle to intercept light rays pertaining to the projected background and in such a position that the photographic images thereof on said light sensitive film are perspectively coordinated with the photographic images of said projected background, light impressing said light sensitive film with images of said projected background and said vehicle while the latter intercepts light rays pertaining to said projected background whereby said light sensitive film is exposed in accordance with said vehicle and said background scene while both thereof have said definite perspective viewpoint, whereby the images of said vehicle and the images of said background are composited in perspective coordination.

2. The method according to claim 1 wherein said vehicle is rocked and the controls therefor manipulated during said compositing.

3. The method according to claim 1 wherein said light sensitive film is simultaneously exposed to light pertaining to said background and to light reflected from said vehicle.

4. The method of making composite motion pictures which comprises arranging a camera in a vertical plane intersecting a background scene at an oblique angle and photographing said background scene with the camera thus arranged, reproducing the background scene thus obtained on a screen, arranging a foreground in front of said screen at the same angle as that from which said background was photographed, and photographing the resulting composite scene with a camera positioned at the same height as that from which the background scene was taken, and arranged with its axis substantially perpendicular to said screen.

FRED W. JACKMAN.